(12) United States Patent
Dorevitch et al.

(10) Patent No.: US 7,787,565 B2
(45) Date of Patent: Aug. 31, 2010

(54) SYSTEM AND METHOD FOR PERFORMING BASEBAND PHASE SHIFTING IN A CARTESIAN FEEDBACK SYSTEM

(75) Inventors: Joshua E. Dorevitch, Chicago, IL (US); John J. Bozeki, Elgin, IL (US); Paul H. Gailus, Prospect Heights, IL (US); Mark Rozental, Gedera (IL)

(73) Assignee: Motorola, Inc., Schaumburg, IL (US)

( * ) Notice: Subject to any disclaimer, the term of this patent is extended or adjusted under 35 U.S.C. 154(b) by 778 days.

(21) Appl. No.: 11/743,746

(22) Filed: May 3, 2007

(65) Prior Publication Data

US 2008/0273626 A1    Nov. 6, 2008

(51) Int. Cl.
*H04L 1/02* (2006.01)
*H04L 27/20* (2006.01)

(52) U.S. Cl. ........................ 375/297; 375/308

(58) Field of Classification Search ................ 375/308, 375/219, 279, 146, 297; 455/76, 260, 323; 331/23
See application file for complete search history.

(56) References Cited

U.S. PATENT DOCUMENTS

| | | | |
|---|---|---|---|
| 5,066,923 A | 11/1991 | Gailus et al. | |
| 5,381,108 A | 1/1995 | Whitmarsh et al. | |
| 5,675,286 A | 10/1997 | Baker et al. | |
| 5,880,633 A | 3/1999 | Leizerovich et al. | |
| 5,959,499 A * | 9/1999 | Khan et al. | 330/149 |
| 6,151,481 A * | 11/2000 | Wilson et al. | 455/13.3 |
| 6,731,694 B2 | 5/2004 | Bozeki et al. | |
| 7,263,139 B1 * | 8/2007 | Kingston et al. | 375/327 |
| 7,353,005 B2 * | 4/2008 | Ben-Ayun et al. | 455/115.2 |
| 2004/0166813 A1 * | 8/2004 | Mann et al. | 455/69 |
| 2006/0068727 A1 | 3/2006 | Salvi | |

OTHER PUBLICATIONS

Dawson, et al. "Automatic Phase Alignment for a Fully Integrated Feedback Power Amplifier System", IEEE Journal of Solid State Circuits, Dec. 2003, pp. 2269-2279.
Sorinin, et al. "A Robust Cartesian Feedback Loop of a 802.11 a/b/g CMOS Transmitter", IEEE Radio Frequency Integrated Circuits Symposium, 2004, pp. 145-147.

* cited by examiner

*Primary Examiner*—Khai Tran

(57) ABSTRACT

A system and method for performing baseband phase shifting in a Cartesian feedback system includes a forward path for receiving an input baseband signal having two components, and performing up-conversion to output a RF signal; a power amplifier for amplifying the RF signal output from the forward path; and a feedback path for down-converting at least a sample of the output from the power amplifier to a feedback baseband signal comprising two components, and providing the feedback baseband signal to the forward path in order to be summed with the input baseband signal at a summing junction and before the loop filter. The forward path includes a baseband phase shifter for adjusting the baseband signal output from the summing junction in order to compensate for any phase shifts induced in the system.

16 Claims, 4 Drawing Sheets

SYSTEM AND METHOD FOR PERFORMING BASEBAND PHASE SHIFTING IN A CARTESIAN FEEDBACK SYSTEM

TECHNICAL FIELD OF THE DISCLOSURE

This disclosure relates generally to Cartesian feedback systems, and more particularly, to a system and method for performing baseband phase shifting in a Cartesian feedback system.

BACKGROUND OF THE DISCLOSURE

Radio communication devices use antennas to provide for the efficient transmission of radio frequency (RF) communication signals. The transmitter portion of a radio communication device includes a power amplifier to amplify the RF signals before they are coupled to the antenna for transmission. For some modulation techniques, such as quadrature amplitude modulation (QAM), linear amplification is desired to prevent distortion of the modulated signal. However, when RF power amplifiers are operated in their most efficient manner at high drive levels, they usually provide a non-linear "compression" characteristic. This means that a change in the amplitude of a signal sent into the power amplifier results in a non-proportional change in the amplitude of the signal out of the amplifier, and therefore causes distortion of the signal. Non-linearities may also be caused by changes in load impedance, as may be caused by the operating environment of the power amplifier.

One manner of improving the linearity of a RF transmitter is to use a Cartesian feedback system, whereby a feedback signal path is provided to create a negative feedback which compensates for compression in the power amplifier. More particularly, in a typical Cartesian feedback system, a drive signal is input at baseband. The drive signal is a complex baseband signal having in-phase (I) and quadrature (Q) components. Each of the I and Q components are summed with a feedback signal and separately filtered and applied to a quadrature up-converter which translates the components to a RF frequency. The RF signal is then amplified by a power amplifier and sent to an antenna for transmission. To create a feedback loop, the output from the power amplifier is fed back to a quadrature down-converter that translates the RF signal to a pair of baseband signals, which are then summed with the original drive signal.

In such systems, a correct phase relationship is required between the local oscillator (LO) signals that are used for driving the quadrature up-converter and down-converter. To set the correct phase relationship, a phase correction is typically performed first in a phase training mode and then updated as necessary in a circulator elimination (CE) mode. In the phase training mode, phase correction is performed by inserting a training signal between the output of a forward path filter and the input to the quadrature up-converter (also known as the LP2 point), shutting off the gain in the baseband input paths, and breaking the loop to maintain the bias of the system. The output of the summing junction for the input baseband signal and the feedback loop is monitored, and an algorithm is used to adjust the phase of one of either the up-converter LO signals or the down-converter LO signals relative to the other until the input I component is aligned with the I channel feedback and the input Q input is aligned with the Q channel feedback to establish correct negative feedback.

In CE mode, the loop is closed and the gain for the baseband input paths is turned on. During operation, the signal from the LP2 point is digitized and sent to a digital signal processor (DSP). The DSP then continuously makes incremental changes to the phase of either the up-converter LO signals or down-converter LO signals based on the relationship between the input signal and the LP2 signal.

However, there are numerous disadvantages to such Cartesian feedback systems. For example, when used with multi-band communication devices, multiple RF filters are required to enable LO signal phase shifting for the multiple bands. Such filters are both large and expensive, even when they are fabricated on an integrated circuit and are therefore undesirable. As phase changes implemented in present systems also result in modulation of the desired output signal, such Cartesian feedback systems also result in a significant amount of off-channel splatter during the incremental phase adjustments performed during the CE mode.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for performing baseband phase shifting in a Cartesian feedback system. The Cartesian feedback system includes a forward path for receiving an input baseband signal having two components and performing an up-conversion to a RF signal, a power amplifier for amplifying the RF signal output from the forward path, and a feedback path for down-converting at least a sample of the output from the power amplifier to a feedback baseband signal and providing the feedback baseband signal to the forward path in order to be summed with the input baseband signal at a summing junction. In accordance with the present disclosure, the forward path also includes a baseband phase shifter for adjusting each signal component output from the summing junction in order to compensate for any phase shifts induced in the system.

As will be described herein, the phase adjustment is performed in two modes. In a phase training mode, the loop is opened (after the summing junction), a training signal is applied at a LP2 point (i.e., at the output of at least one loop filter in the forward path), a second signal is measured at the output of the summing junction, and the baseband phase shifter is set to adjust each signal component output from the summing junction based on the phase difference between the training signal and the second signal.

In a circulator elimination mode, the loop is closed, an input baseband signal is provided to the forward path, a third signal is measured at the LP2 point, and the baseband phase shifter is set to adjust each signal component output from the summing junction based on the phase difference between the input baseband signal and the third signal.

Figure 1:
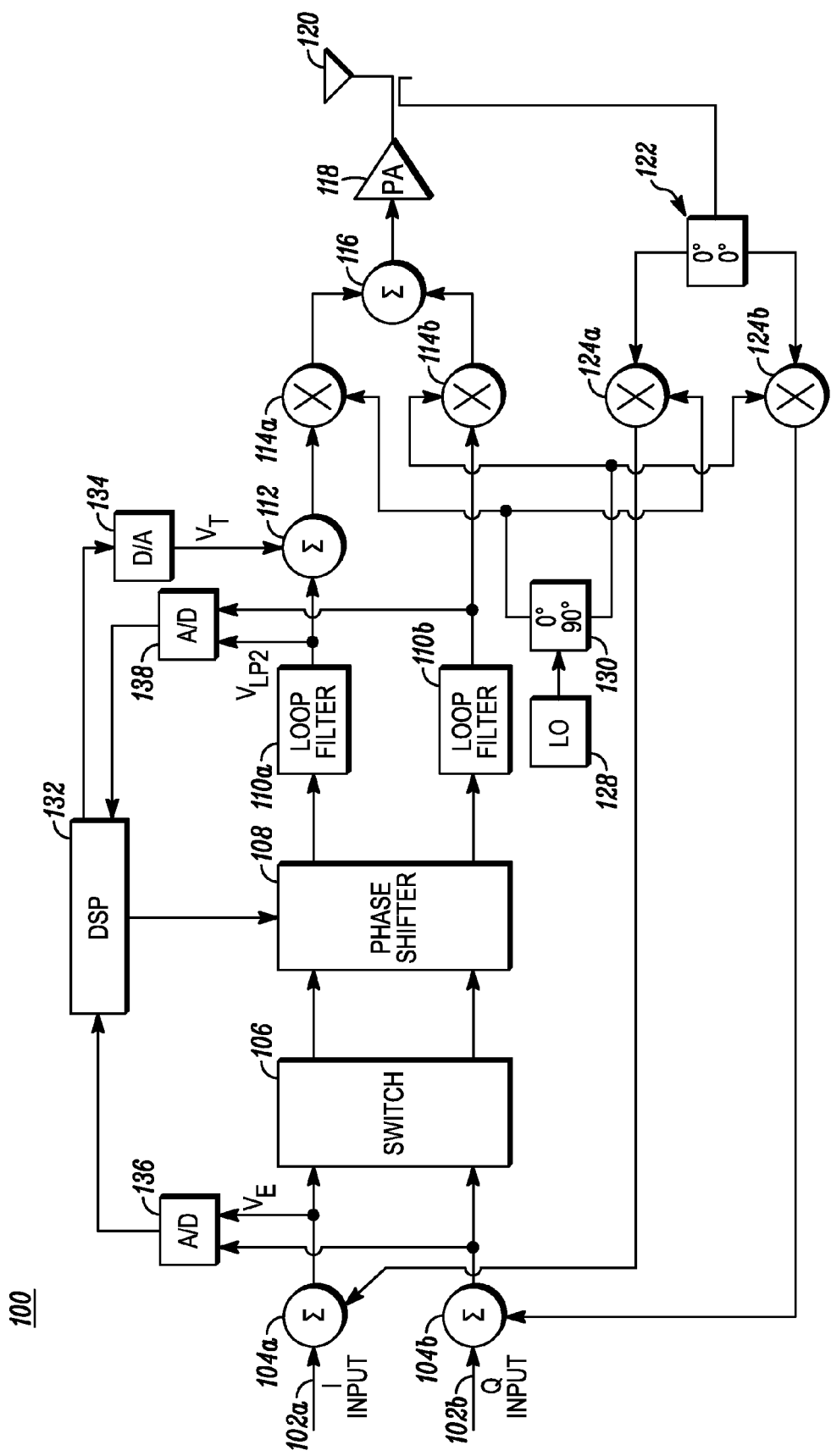
FIG. 1 shows one embodiment of a Cartesian feedback system in accordance with the present disclosure.
Figure 2:
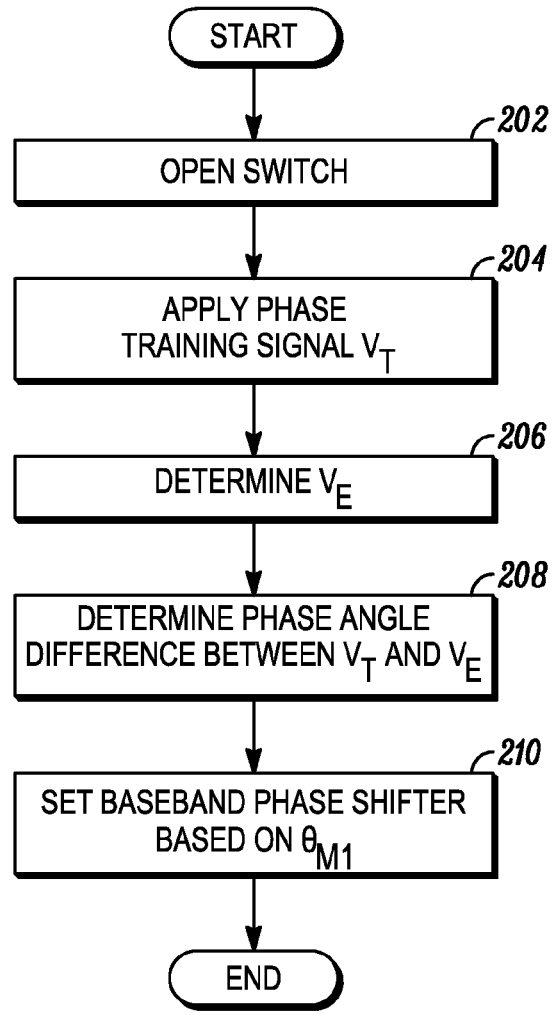
FIG. 2 shows one embodiment of a method for operating the system of FIG. 1 in a first mode in accordance with the present disclosure.

Let us now discuss the present disclosure in greater detail by referring to the figures below. FIG. 1 illustrates one exemplary embodiment of a Cartesian feedback system 100 in accordance with the present disclosure. A baseband input signal, comprised of in-phase (I) and quadrature (Q) components is input into the Cartesian feedback system on two separate channels 102a and 102b, respectively. The two baseband components are applied to a forward path of the Cartesian feedback system.

In the forward path, the I and Q input baseband components are first summed, via summers 104a and 104b, with the output of the feedback path. The summed signals are then passed, via switch 106, to a baseband phase shifter 108. As will be discussed in more detail below, the baseband phase shifter 108 is configured in accordance with the present disclosure to adjust the baseband components to produce a phase shifted baseband output comprising two components. The output of the baseband phase shifter 108 is then sent to loop filters 110a and 110b (e.g., one component is sent to loop filter 110a and the other component is sent to loop filter 110b).

The outputs from loop filters 110a and 110b are applied to a quadrature up-converter that performs up-conversion to RF. Thus, each of the outputs from loop filters 110a and 110b are respectively supplied to mixers 114a and 114b, where they are mixed with signals derived from a local oscillator (LO) 128 and phase splitter 130. More specifically, the output of the LO 128 passes through a 0°/90° phase splitter to provide two signals that are substantially 90° phase shifted relative to one another. The two 90° phase shifted signals are mixed with the outputs of loop filters 110a and 110b, and then summed via summer 116, to achieve quadrature up-conversion to RF. Of course, it is understood that although a one step conversion from baseband to RF is illustrated, it is well-known that the up-conversion can also be performed in multiple steps via intermediate frequencies (IF).

As can be seen from FIG. 1, prior to converting the signal to RF, the output from at least one loop filter (for example, 110a in FIG. 1) may also be summed, via a summer 112, with a phase training signal $V_T$ sent from a digital signal processor (DSP) 132 via at least one digital-to-analog (D/A) converter 134. The D/A 134 converter may include filtering to reduce unwanted distortion or noise. As will be discussed in more detail below, the phase training signal $V_T$ may be used in determining and adjusting phase shifts induced by the Cartesian feedback system.

The up-converted RF signal is then applied to a RF power amplifier (PA) 118, the output of which is provided to an antenna 120 in order to transmit the signal. A sample of the output from the PA 118 is also obtained to drive the feedback path of the Cartesian feedback system 100. In particular, the feedback path includes a quadrature down-converter, where the sample signal is first applied to a 0°/0° splitter 122. The outputs of the 0°/0° splitter are applied to two mixers 124a and 124b. At mixers 124a and 124b, each of the two outputs from the 0°/0° splitter 122 are mixed with the signals that are derived from the same LO 128 and 0°/90° phase splitter 130 as used for the quadrature up-converter. The outputs from mixers 124a and 124b are representative of the two quadrature components of the feedback baseband signal, and are summed, via summers 104a and 104b respectively, with the I and Q components of the input baseband signal. Thus, in the present Cartesian feedback system, unlike prior art systems providing phase correction in open and closed loop modes, a single phase splitter 130 can be used to drive both the up-converter the down-converter. Of course, separate phase splitters may be used if desired.

The DSP 132 is configured to control the baseband phase shifter based on various inputs (e.g., $V_E$ and $V_{LP2}$) received from the forward path of the Cartesian feedback system, the specifics of which are described below. As shown in FIG. 1, analog-to-digital (A/D) converters 136 and 138 may also be provided to enable the communication of signals from the forward path to the DSP 132. Of course, although multiple A/D converters 136 and 138 are illustrated, it should be understood that a single A/D converter may be used for all signals sent from the forward path to the DSP 132. Although not illustrated in FIG. 1, it should further be understood that the DSP 132 may also be configured to provide the input baseband signal to the Cartesian feedback system 100.

In accordance with the present disclosure, the Cartesian feedback system 100 is configured to operate in one of two modes, which are described below with reference to FIGS. 2-5. The first mode, also referred to herein as phase training mode, is described in FIG. 2.

Phase training mode is used to provide an initial adjustment of loop phase shift in the Cartesian feedback system 100. In this mode mode, switch 106 is opened in step 202, and the phase training signal $V_T$ is applied to the summer 112 (i.e., the LP2 point) by the DSP 132 in step 204. The phase training signal $V_T$ is typically a relatively low level signal applied at the beginning of a transmission (e.g., with no input baseband signal being applied), but may also be applied during a transmission depending on specific communication protocols. In the embodiment illustrated herein, the phase training signal $V_T$ is applied only at the output of loop filter 110a, and therefore comprised only of an I component. However, it should be understood that the phase training signal $V_T$ may also be provided at the output of loop filter 110b (in which case the signal may include only a Q component) or at a combination of both outputs of both loop filters 110a and 110b (in which case the signal may include both I and Q components). Also, phase training signal $V_T$ may be provided at the input to one or both loop filters, but will be subject to the loop filter response.

Figure 3:
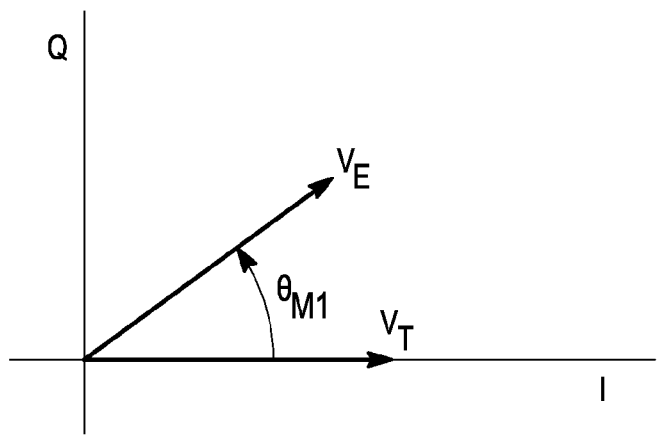
FIG. 3 shows a first vector diagram in accordance with the present disclosure.

In step 206, the outputs of summers 104a and 104b (collectively referred to as $V_E$) are digitized by A/D converter 136 and sent to DSP 132. In step 208, the DSP 132 measures a phase difference $\theta_{M1}$ between $V_T$ and $V_E$. To best illustrate how the phase difference $\theta_{M1}$ is determined, an example is shown in FIG. 3. In this example, both signal $V_T$ and $V_E$ are illustrated as vectors, with the vertical axis representing the Q component and the horizontal axis representing the I component. The phase training signal $V_T$ includes only the I component, while $V_E$ includes both a Q component and an I component. The angle between these two vectors is defined as the phase difference $\theta_{M1}$.

The DSP 132 provides information regarding the measured phase difference $\theta_{M1}$ to the baseband phase shifter 108 and, in step 210, the baseband phase shifter is set based on the measured phase difference $\theta_{M1}$ in order to compensate for the phase shift between $V_T$ and $V_E$. For example, in one embodiment, the baseband phase shifter 108 may be configured to compensate for the measured phase shift by weighting the sums of the two input signals in accordance with the following formulas:

$$\text{Output1}=\text{in1}*\cos\Phi-\text{in2}*\sin\Phi \quad (1)$$

$$\text{Output2}=\text{in1}*\sin\Phi+\text{in2}*\cos\Phi \quad (2)$$

where Output1 is the signal output from the baseband phase shifter 108 to loop filter 110a, Output2 is the signal output from the baseband phase shifter 108 to loop filter 110b, in1 is the signal input from summer 104a, in2 is the signal input from summer 104b, and $\Phi$ is a phase angle that is set based on the phase difference information received from the DSP 132. In this exemplary embodiment, the value $\Phi$ would be set substantially equal to $-\theta_{M1}$ during phase training mode to compensate for any phase shifts induced in the Cartesian feedback system 100.

Figure 4:
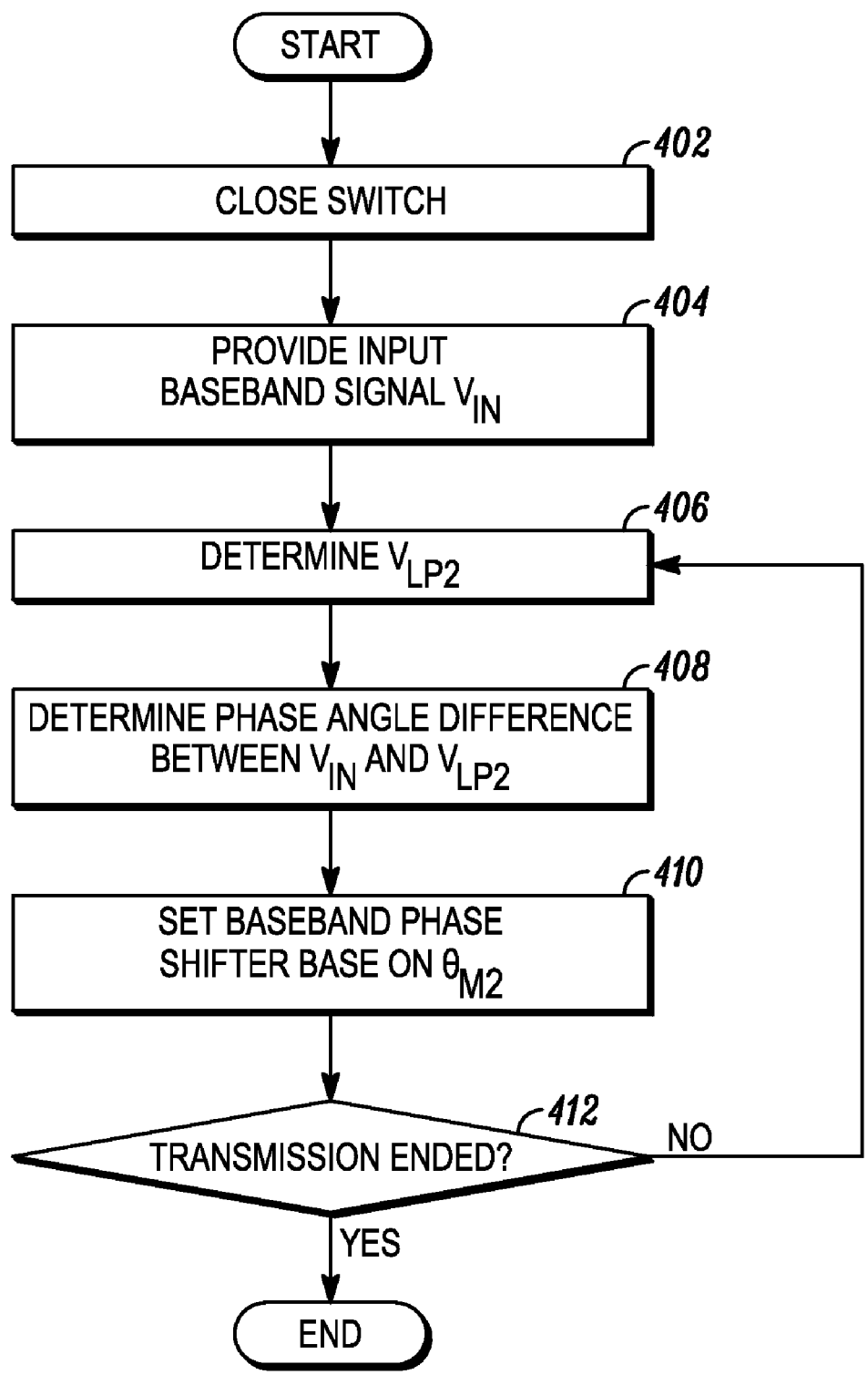
FIG. 4 shows one embodiment of a method for operating the system of FIG. 1 in a second mode in accordance with the present disclosure.

A second mode of operation for the Cartesian feedback system, also referred to as circulator elimination (CE) mode, is illustrated in FIG. 4. This mode of operation is generally used to continually monitor and compensate for phase changes during transmission caused by various changing conditions such as temperature, load, or variations in signal level or battery voltage level.

In step 402, the switch 106 is closed, and an input baseband signal (also referred to as $V_{IN}$) is applied to channels 102a and 102b of the Cartesian feedback system in step 404. As noted above, the input baseband signal $V_{IN}$ may be sourced from DSP 132, another digital signal processor, or any another well-known component for providing a baseband signal.

Figure 5:
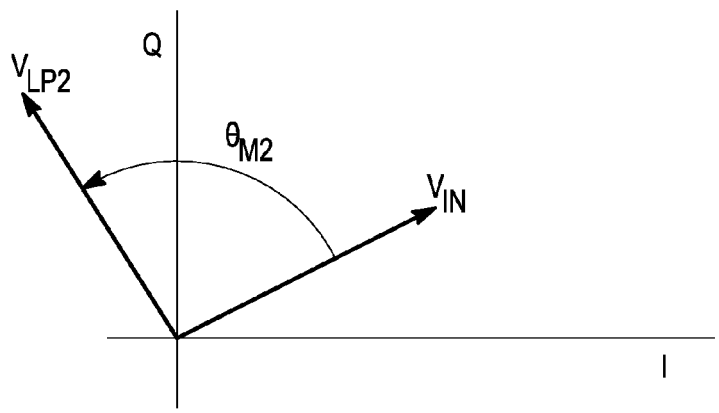
FIG. 5 shows a second vector diagram in accordance with the present disclosure.

In step 406, the output of loop filters 110a and 110b (collectively referred to as $V_{LP2}$) is digitized via A/D converter 138 and sent to DSP 132. In step 408, the DSP 132 measures a phase difference $\theta_{M2}$ between $V_{IN}$ and $V_{LP2}$. One example for performing this step is illustrated in FIG. 5. Similar to FIG. 3, both signals $V_{IN}$ and $V_{LP2}$ are illustrated as vectors, with the vertical axis representing the Q component and the horizontal axis representing the I component. The angle between the two vectors is defined as $\theta_{M2}$.

The DSP provides information regarding the measured phase difference $\theta_{M2}$ to the baseband phase shifter 108 and, in step 410, the baseband phase shifter is set based on the measured phase difference $\theta_{M2}$ in order to compensate for the phase shift between $V_{IN}$ and $V_{LP2}$. For example, assuming that the baseband phase shifter 108 is configured to weight the input signals based on formulas (1) and (2) provided above, the value $\Phi$ would be set substantially equal to $\theta_{M2}$. In one embodiment, upon receiving the measured phase difference from the DSP 132, the baseband phase shifter may be set to instantaneously compensate for a measured phase difference. However, alternatively, the baseband phase shifter 108 may also be configured to make adjustments to the phase in incremental steps between a prior received phase difference and a currently received phase difference over a set period of time. Also, at the beginning of the CE mode period where such prior phase difference has not been established, the initial incremental step can be made relative to the initial adjustment established in phase training.

In step 412, it is determined whether the transmission has ended. If not, the process returns to step 406 to allow for additional phase adjustments to be made. If the transmission has ended, then the process ends.

By means of the aforementioned disclosure, a Cartesian feedback system is provided in which phase adjustments are performed at the baseband signal during both training and CE modes, and thus does not require any RF phase shifting. This provides various advantages over the prior art systems. For example, as noted above, the present system requires only a single LO and phase splitter to perform both up-conversion and down-conversion, which can provide a significant reduction to both the cost and size of the Cartesian feedback system. Since phase shifting is performed at baseband, the phase shifter is also band independent and may therefore be easily implemented for multi-band radios.

Figure 6:
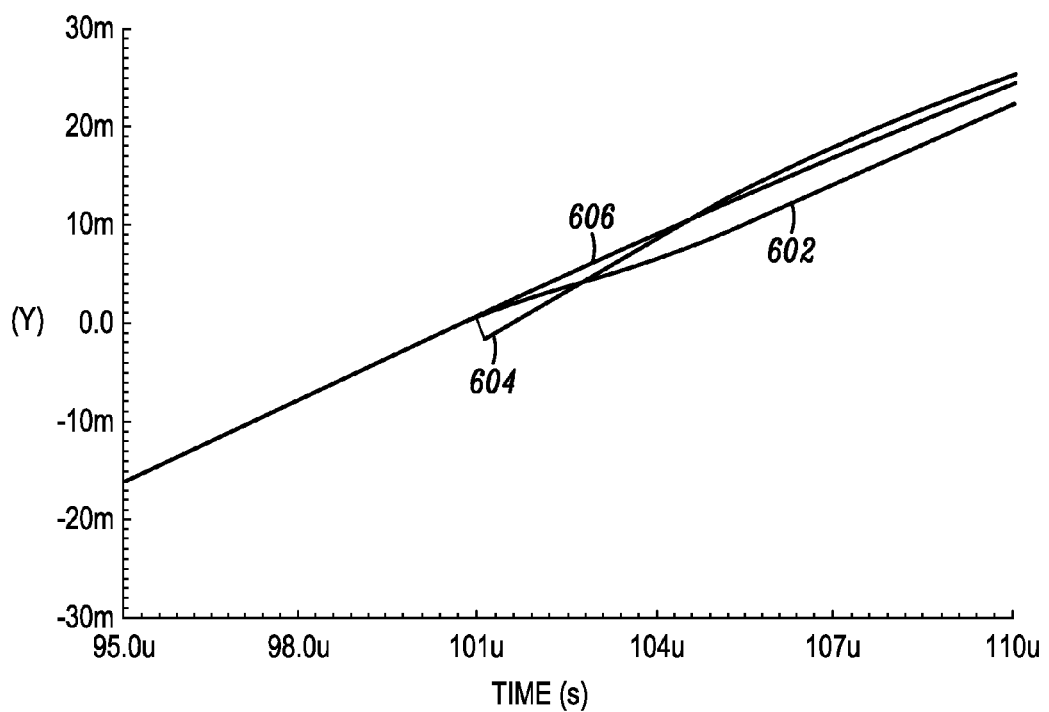
FIG. 6 shows a time domain plot in accordance with the present disclosure.

The disclosed system also results in a significant decrease in the amount of off-channel splatter in closed loop operation as compared to prior art systems. This is illustrated in FIG. 6, which shows the effects of phase adjustments on the signal output from the power amplifier in the time domain. In particular, line 602 illustrates the effects of a phase change performed by adjusting the phase of down-converter LO signals relative to those of the up-converter, as done in prior art systems. Line 604 illustrates the effects of a phase change performed by adjusting the phase of the up-converter LO signals relative to those of the down-converter, as has also been done in prior art systems. Line 606, on the other hand, illustrates the effects of a phase change performed by adjusting the phase of the baseband signal before loop filtering and associated forward path gain according to the present disclosure. As can be seen, when the down-converter LO signals are adjusted to implement a phase change, the output of the PA also experiences a change, although in a filtered manner due to the forward path loop filters. When the up-converter LO signals are adjusted to implement a phase change, a more abrupt change occurs which will produce a broadband spectral rise. However, when the phase shift is performed at baseband, where the magnitude of the baseband signal is relatively small it can be seen that no significant change occurs at the power amplifier output even though a phase shift is occurring in the baseband signal. Thus, there is significantly less splatter when the phase change is performed on the baseband signal in accordance with the present disclosure.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A Cartesian feedback system comprising:
    a forward path for receiving an input baseband signal having two components, and performing up-conversion to output a radio frequency (RF) signal;
    a power amplifier for amplifying the RF signal output from the forward path; and
    a feedback path for down-converting at least a sample of the output from the power amplifier to produce a feedback baseband signal comprising two components, and providing the feedback baseband signal to the forward path in order to be summed with the input baseband signal at a summing junction; and wherein the forward path includes a baseband phase shifter followed by one or more loop filters for adjusting the phase of a baseband signal output from the summing junction in order to compensate for any phase shifts induced in the system, the forward path including a quadrature up-converter driven by a local oscillator and phase splitter, and the feedback path including a quadrature down-converter driven by the same local oscillator and phase splitter as the quadrature up-converter.

2. A Cartesian feedback system comprising:

a forward path for receiving an input baseband signal having two components, and performing up-conversion to output a radio frequency (RF) signal;

a power amplifier for amplifying the RF signal output from the forward path; and a feedback path for down-converting at least a sample of the output from the power amplifier to produce a feedback baseband signal comprising two components, and providing the feedback baseband signal to the forward path in order to be summed with the input baseband signal at a summing junction;

wherein the forward path includes a baseband phase shifter followed by one or more loop filters for adjusting the phase of a baseband signal output from the summing junction in order to compensate for any phase shifts induced in the system; and a processor in communication with the baseband phase shifter, and wherein the forward path further includes a switch for opening and closing the forward path, and two loop filters for filtering each of the outputs of the baseband phase shifter.

3. The system of claim 2 wherein the system is configured to operate in a phase training and a circulator elimination mode.

4. The system of claim 3 wherein, in the phase training mode, the switch is opened, and the processor is configured to apply a first signal to an output of at least one of the two loop filters, obtain a second signal comprised of both signal components output from the summing junction, determine a phase difference between the first and second signal, and instruct the baseband phase shifter to adjust the phase of the baseband signal output from the summing junction based on the phase difference.

5. The system of claim 3 wherein, in circulator elimination mode, the switch is closed, and input baseband signal is provided to the forward path, and the processor is configured to obtain a third signal comprised of the signal components output from each of the two loop filters, determine a phase difference between the input baseband signal and the third signal, and instruct the baseband phase shifter to adjust the phase of the baseband signal output from the summing junction based on the phase difference.

6. A method for performing a phase training mode in a Cartesian feedback system having a forward path having two channel inputs for receiving an input baseband signal having two components, a summing junction for summing the input baseband signal with a feedback baseband signal, a switch for opening and closing the forward path, a baseband phase shifter for adjusting the phase of the summed signal, two loop filters for filtering the output of the baseband phase shifter, and a quadrature up-converter for up-converting the output of the two loop filters to a radio frequency (RF) signal; the method comprising:

opening the switch;

applying a first signal from a processor to an output of at least one of the loop filters;

sending, to the processor, a second signal comprised of both components of the summed signal;

determining a phase difference between the first signal and the second signal; and adjusting, at the baseband phase shifter, each component of the summed signal in order to compensate for the phase difference between the first and second signals.

7. The method of claim 6 wherein the first signal is applied from the processor to the output of at least one of the loop filters via a digital-to-analog converter.

8. The method of claim 6 wherein the second signal is sent to the processor via an analog-to-digital converter.

9. The method of claim 6 wherein adjusting the phase includes adjusting a first component based on the formula: $in1*\cos\Phi - in2*\sin\Phi$, where $in1$ is the value of the first component input into the baseband phase shifter, $in2$ is the value of a second component input into the phase shifter, and $\Phi$ is set based on the phase difference between the first and second signal.

10. The method of claim 9 wherein adjusting the phase includes adjusting the second component based on the formula: $in1*\sin\Phi + in2*\cos\Phi$.

11. The method of claim 10 wherein the value of $\Phi$ is substantially the negative of the phase difference between the first and second signal.

12. A method for performing a circulator elimination mode in a Cartesian feedback system having a forward path having two channel inputs for receiving an input baseband signal having two components, a summing junction for summing the input baseband signal with a feedback baseband signal, a switch for opening and closing the forward path, a baseband phase shifter for adjusting the phase of the summed signal, two loop filters for filtering the outputs of the baseband phase shifter, and a quadrature up-converter for up-converting the output of the two loop filters to a radio frequency (RF) signal; the method comprising:

closing the switch;

providing an input baseband signal to the forward path;

sending, to the processor, a third signal comprised of the signal components output from both of the loop filters;

determining a phase difference between the input baseband signal and the third signal; and adjusting, at the baseband phase shifter, the phase of the summed signal based on the phase difference between the input baseband signal and the third signal.

13. The method of claim 12 wherein the third signal is sent to the processor via an analog-to-digital converter.

14. The method of claim 12 wherein adjusting the phase includes adjusting a first component based on the formula: $in1*\cos\Phi - in2*\sin\Phi$, where $in1$ is the value of the first component input into the baseband phase shifter, $in2$ is the value of a second component input into the phase shifter, and $\Phi$ is set based on the phase difference between the input baseband signal and the third signal.

15. The method of claim 14 wherein adjusting the phase includes adjusting the second component based on the formula: $in1*\sin\Phi + in2*\cos\Phi$.

16. The method of claim 15 wherein the value of $\Phi$ is substantially equal to the phase difference between the input baseband signal and the third signal.

* * * * *